US012382191B2

United States Patent
Hanchate et al.

(10) Patent No.: US 12,382,191 B2
(45) Date of Patent: Aug. 5, 2025

(54) CAMERA FUSION ARCHITECTURE TO ENHANCE IMAGE QUALITY IN THE REGION OF INTEREST

(71) Applicant: Intel Corporation, Santa Clara, CA (US)

(72) Inventors: Mallari Hanchate, Bangalore (IN); Melanie Daniels, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 572 days.

(21) Appl. No.: 17/671,542

(22) Filed: Feb. 14, 2022

(65) Prior Publication Data
US 2022/0174213 A1   Jun. 2, 2022

(51) Int. Cl.
| H04N 23/951 | (2023.01) |
| G06F 1/16 | (2006.01) |
| H04N 5/265 | (2006.01) |
| H04N 23/611 | (2023.01) |
| H04N 23/63 | (2023.01) |
| H04N 23/90 | (2023.01) |

(52) U.S. Cl.
CPC ......... *H04N 23/951* (2023.01); *G06F 1/1686* (2013.01); *H04N 5/265* (2013.01); *H04N 23/611* (2023.01); *H04N 23/63* (2023.01); *H04N 23/90* (2023.01)

(58) Field of Classification Search
CPC .... H04N 23/951; H04N 5/265; H04N 23/611; H04N 23/63; H04N 23/90; G06F 1/1686
USPC .......................................................... 348/222.1
See application file for complete search history.

(56) References Cited

U.S. PATENT DOCUMENTS

| 6,781,606 | B2 * | 8/2004 | Jouppi | H04N 7/142 |
| | | | | 715/740 |
| 11,145,277 | B2 * | 10/2021 | Morein | H04N 13/383 |
| 11,568,783 | B1 * | 1/2023 | Sahlsten | G09G 3/2092 |
| 11,832,018 | B2 * | 11/2023 | Ilan | H04N 5/2625 |
| 2004/0003409 | A1 * | 1/2004 | Berstis | H04N 21/2187 |
| | | | | 348/E7.086 |
| 2013/0100255 | A1 * | 4/2013 | Ohba | H04N 13/156 |
| | | | | 348/47 |
| 2017/0236466 | A1 * | 8/2017 | Spitzer | G09G 3/3266 |
| | | | | 345/560 |
| 2021/0203836 | A1 * | 7/2021 | Qin | H04N 23/69 |
| 2021/0392267 | A1 * | 12/2021 | Lee | H04N 23/667 |

* cited by examiner

*Primary Examiner* — Lin Ye
*Assistant Examiner* — Chan T Nguyen
(74) *Attorney, Agent, or Firm* — Hanley, Flight & Zimmerman, LLC (57) ABSTRACT

This disclosure describes systems, methods, and devices related to enhanced image quality. A device may capture a first image data from a first camera of a plurality of cameras attached in a forward facing direction toward an object in a first field of interest. The device may compare a resolution of the first image data to a base visual quality threshold. The device may, based on the comparison, select a second camera of the plurality of cameras for capturing a second image data of the object. The device may combine the first image data from the first camera and the second image data from the second camera. The device may generate a third image data based on combining the first image data and the second image data.

20 Claims, 7 Drawing Sheets

CAMERA FUSION ARCHITECTURE TO ENHANCE IMAGE QUALITY IN THE REGION OF INTEREST

TECHNICAL FIELD

This disclosure generally relates to systems and methods for wireless communications and, more particularly, to novel camera fusion architecture to enhance image quality in the region of interest.

BACKGROUND

A camera lens can be susceptible to reduced quality depending on the distance and field of view. Video coding standards are being developed to improve video quality. However, improved video quality comes at a cost of the size of the camera lens. There is a need to enhance the quality and resolution of the camera lens for front facing cameras.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Currently, similar to smartphones, front facing cameras for laptops are given equal attention due to the rise in work from home, online education requirements. There is a continuous improvement by manufacturers to improve image quality of the user facing camera by increasing the camera resolution and field of view (FOV) to cover maximum faces in the object frame. However, laptops are getting thinner and making it difficult to accommodate high-resolution cameras because the high resolution and wide FOV cameras need thicker lens assembly. Panamorph lens design helps to keep the lens assembly smaller in Y and Z heights, paving way to wide FOV camera design for laptops and tablets. Although a wide FOV camera can provide a solution space for a bigger object screen (more face in frame) but the pixel per face/object declines as the user distance from the camera increases resulting in poor image quality. Panamorphic lens is a type of camera lens similar to a fisheye lens, where a user can see a wide field of view. Although it is structurally different, it provides a thinner Z height in a camera's design. Typically, cameras in a laptop lid have to be much thinner than any camera (e.g., a phone camera). A challenge is to design a thin camera with high resolution and wide view in a laptop or a computer lid. In other words, there is a need to design a thinner Z height in a camera. In addition to having a thinner Z height in a camera, it is also desirable to have enhanced image resolution. For example, in a conference call, the pixels across a user's face are associated with a low resolution. However, the higher the resolution, the thicker the lens structure. In some camera designs in order to increase the resolution, the autofocus of a camera is employed.

Prior solutions utilize cameras with greater than 13 Mp wide FOV camera to increase pixel per face. However such cameras have a bulkier size that may not fit in a lid of a laptop or tablet. That is, high resolution camera (>13 MP) with a Panamorph lens will still need a larger Z height greater than 5 mm. Some other solutions may utilize autofocus cameras but autofocus cameras may not be feasible in a laptop or a tablet front facing application due to space limitations because autofocus cameras are bulkier. These solutions are not practical for laptop or tablet design.

There is a need to utilize a higher quality camera in terms of the resolution, as well as a need to cover the maximum image frame with a bigger field of view. However, the current state of the art is that with higher resolution and higher field of view, the thicker the camera.

Example embodiments of the present disclosure relate to systems, methods, and devices for novel camera combination architecture to enhance image quality in the region of interest for a wide FOV camera solution. That is, an enhanced image quality system may facilitate a novel mechanism to combine wide FOV and narrow FOV to improve pixel per face at various distances targeting a lowest Z height in slim laptop design. A camera with wide FOV needs a higher resolution sensor to meet the image quality requirement to capture users at farther distances. Since high resolution camera demands thicker lens, they cannot be housed in laptop designs.

In one or more embodiments, an enhanced image quality system may utilize two or more cameras, instead of a single wide field of view camera in a front facing setup in order to provide the capability to intelligently switch between these two or more cameras while maintaining an overall reduced Z height of the camera.

In one or more embodiments, an enhanced image quality system may facilitate switching between the two wide fields of view and narrow field of view cameras, such both field of views are used to enhance image resolution in various applications of image processing. For example, if a user in a field of view of the cameras starts moving away from the device, an enhanced image quality system may switch between two or more cameras in order to enhance the resolution of images. Switching between cameras may refer to switching, stitching, or fusing camera images.

In one or more embodiments, an enhanced image quality system may use a wide FOV red-green-blue (RGB) camera with better resolution (e.g., 8 MP camera) and a narrow FOV Camera with lower or the same resolution (e.g., 1-2 MP or 8 MP camera) to implement a combination/fusion mechanism to provide better pixel per face for a user at various distances from the device.

In one or more embodiments, when a user is close to the device, the wide FOV camera can cover the maximum object screen and acceptable pixel per face. As the user moves away from the device, a narrow FOV camera can enhance the pixel per face. For example, a user situated about 60 centimeters from a laptop may be enough for the user to have their hands close to the keyboard in order to easily type. In that case, the field of view matters because as the user moves closer to the camera, the field of view is reduced. While as the user moves away from the laptop, the field of view must increase. For example, with a 68 degree field of view, two users on average who are sitting right next to each can be covered by the camera. As the field of view increases, more users may be covered at the same distance. The combined/fused image from wide FOV and narrow FOV cameras gives an enhanced video experience without compromising image quality and without the need for autofocus or higher resolution cameras that may compromise the thickness needed on a lid of a laptop or tablet, for example.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

Figure 1:
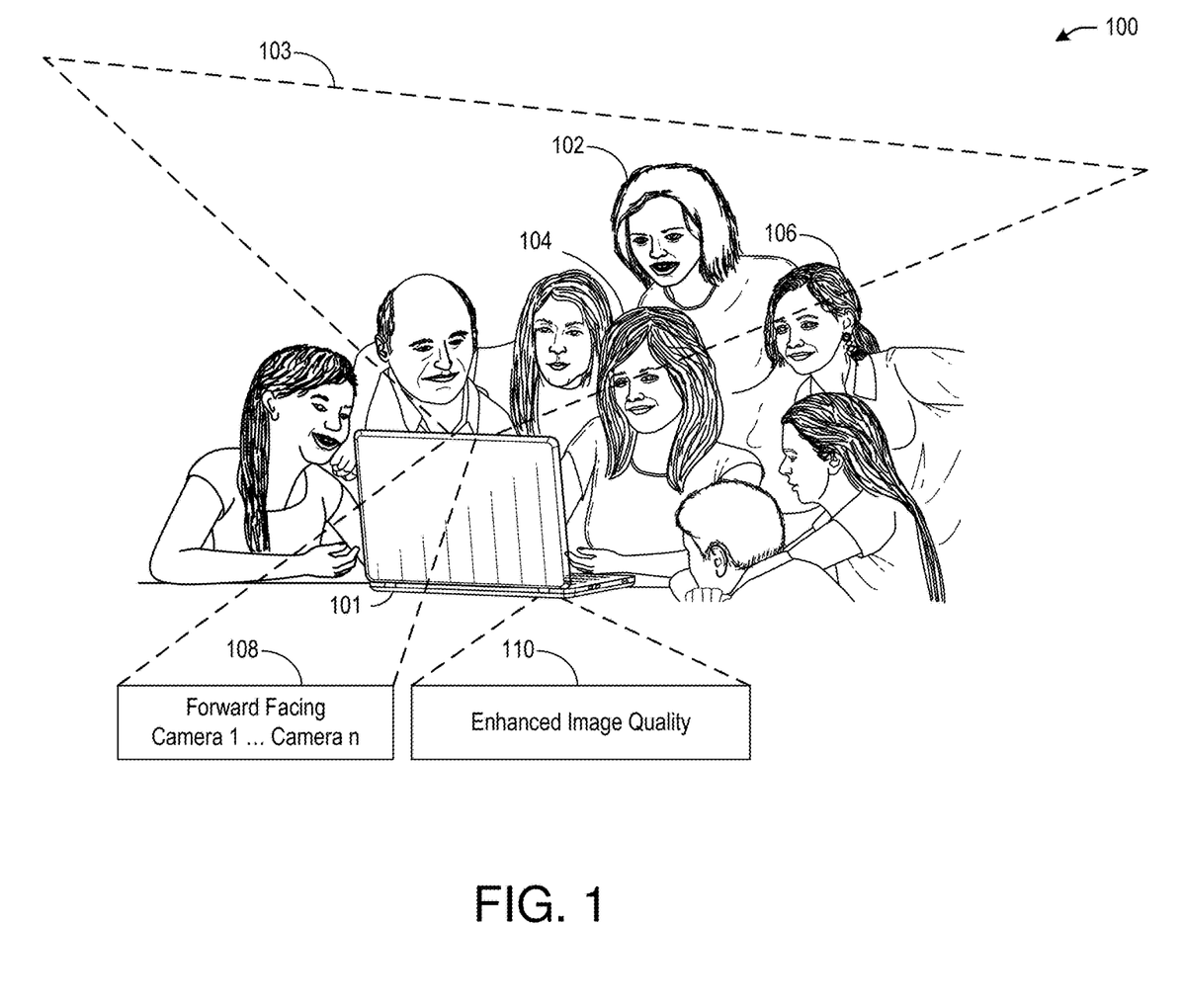
FIG. 1 depicts an illustrative schematic diagram for enhanced image quality, in accordance with one or more example embodiments of the present disclosure.

FIG. 1 depicts an illustrative schematic diagram 100 for enhanced image quality, in accordance with one or more example embodiments of the present disclosure.

Referring to FIG. 1, there is shown an example use case where an enhanced image quality system may be applicable. In this example is shown a laptop 101 that may be used for a conference call with a plurality of users (e.g., users 102, 104, and 106). The laptop 101 may be equipped with a plurality of forward facing cameras 108 (camera 1, . . . , camera n) that may be installed in the lid of the laptop 101. As can be appreciated, the advancements in the laptop dimensions require that the lid of the laptop 101 be as thin as possible (e.g., less than or equal to 5 mm). The forward facing cameras 108 may cover a variety of field of views (FOVs) (e.g., the FOV 103) depending on whether they are a wide FOV camera or a narrow FOV camera. In this example, the FOV 103 covers a subset of the users including users 104 and 102. User 106 is shown to be located at a wide distance from the forward facing cameras 108, while user 102 is shown to be located at a far distance from the forward facing cameras 108. The laptop 101 may comprise an enhanced image quality system 110 that may be utilized to combine one more image data received from the forward facing cameras 108 in order to leverage a user that is located at a far distance (e.g., user 102) and a user located at a wide distance (e.g., user 106).

There are many cases that may require such an enhanced image quality system 110. For example, in a huddle use case (as in FIG. 1), where a user 104 may place their laptop in a conference room and other users around the table can be seen with that camera and even the person at the end of the table. In that case, a large field of view (e.g., FOV 103) may be necessary (e.g., 100 degrees field of view) in order to capture everyone in the room. Another example may be a smart framing scenario, which may be a far body tracking where for example there may be two people in a room, one person moves out of the frame and the camera would zoom in on the other person. As the first person moves back into the frame, the camera zooms back to capture both people. Another example may be where a person is presenting on a whiteboard, as the person moves out of the frame, the whiteboard becomes the focal point. Therefore, an enhanced image quality system 110 may provide a higher resolution with a wider field of view. It should be understood that there are additional use cases where an enhanced resolution is needed with a wider field of view.

In one or more embodiments, an enhanced image quality system 110 may utilize one or more requirements from various image algorithms in order to provide an enhanced camera resolution even with a wider field of view (e.g., forward facing cameras 108).

In one or more embodiments, an enhanced image quality system 110 may utilize a plurality of cameras (e.g., forward facing cameras 108) that are capable of using a narrow FOV camera and a wide FOV camera in order to achieve a higher resolution with a wider field of view. The enhanced image quality system 110 may facilitate combining two streams of image data in order to achieve a lower camera lens thickness as well as the required resolution and wide field of view to satisfy various use cases.

In one or more embodiments, an enhanced image quality system 110 may facilitate tracking objects and switching image data between a plurality of cameras (e.g., wide FOV or narrow FOV cameras) based on the object becoming outside of a narrow field of view to a wide field of view. In some embodiments, captured images may be combined/fused together to be a single stream of image data.

In one or more embodiments, an enhanced image quality system 110 may determine a type of camera to use (e.g., wide or narrow view cameras) based on the objects in an area of interest.

Another example is an advertisement scenario, where a salesperson may be selling a product on the Internet using a video. As the salesperson is in the field of view of the camera, the camera may be focused on the salesperson's face. However, an algorithm may be utilized to track a specific object (e.g., the item for sale). In some scenarios, the camera may crop the salesperson's face when it's in the area of interest or crop the specific object when it is in the area of interest.

In one or more embodiments, an enhanced image quality system 110 may generate a new image that is based on a first image data received from a first camera and a second image data received from a second camera. This new image may be based on switching, stitching, or fusing of the first image and the second image.

It is understood that the above descriptions are for purposes of illustration and are not meant to be limiting.

Figure 2:
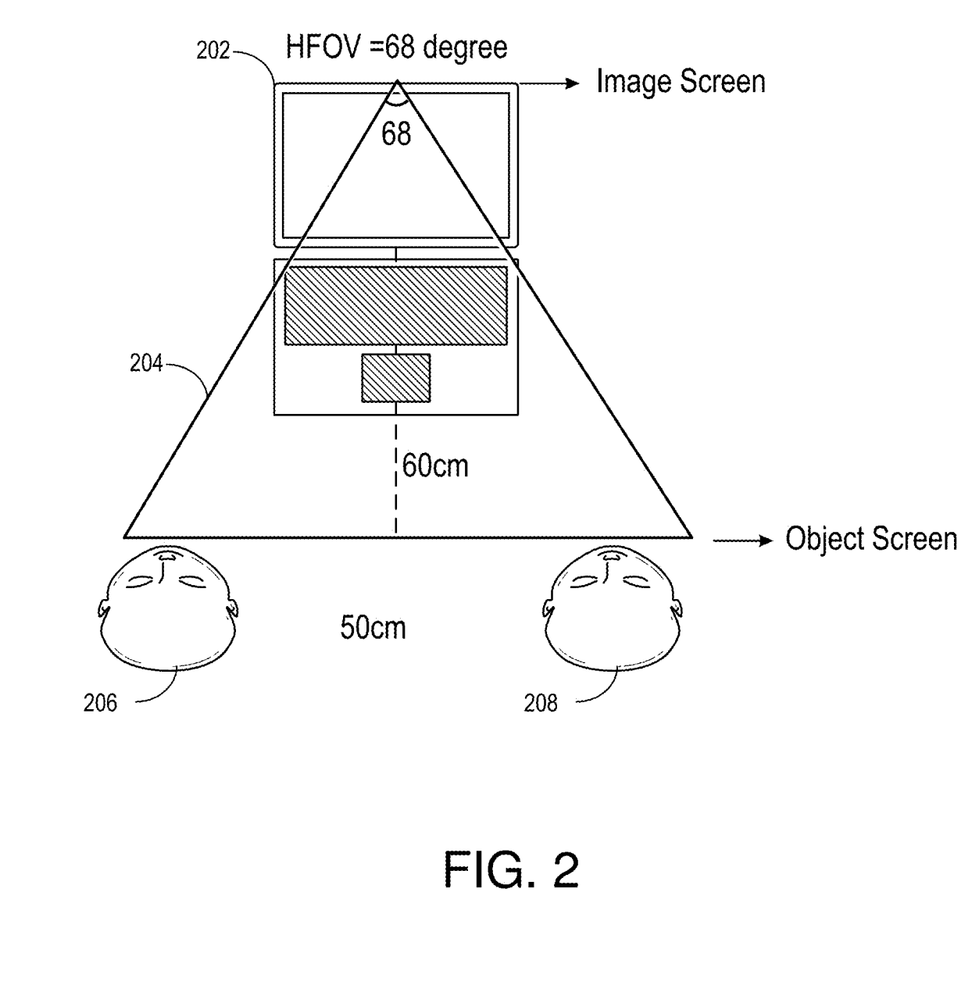
FIGS. 2 and 3 depict illustrative schematic diagrams for enhanced image quality, in accordance with one or more example embodiments of the present disclosure.
Figure 3:
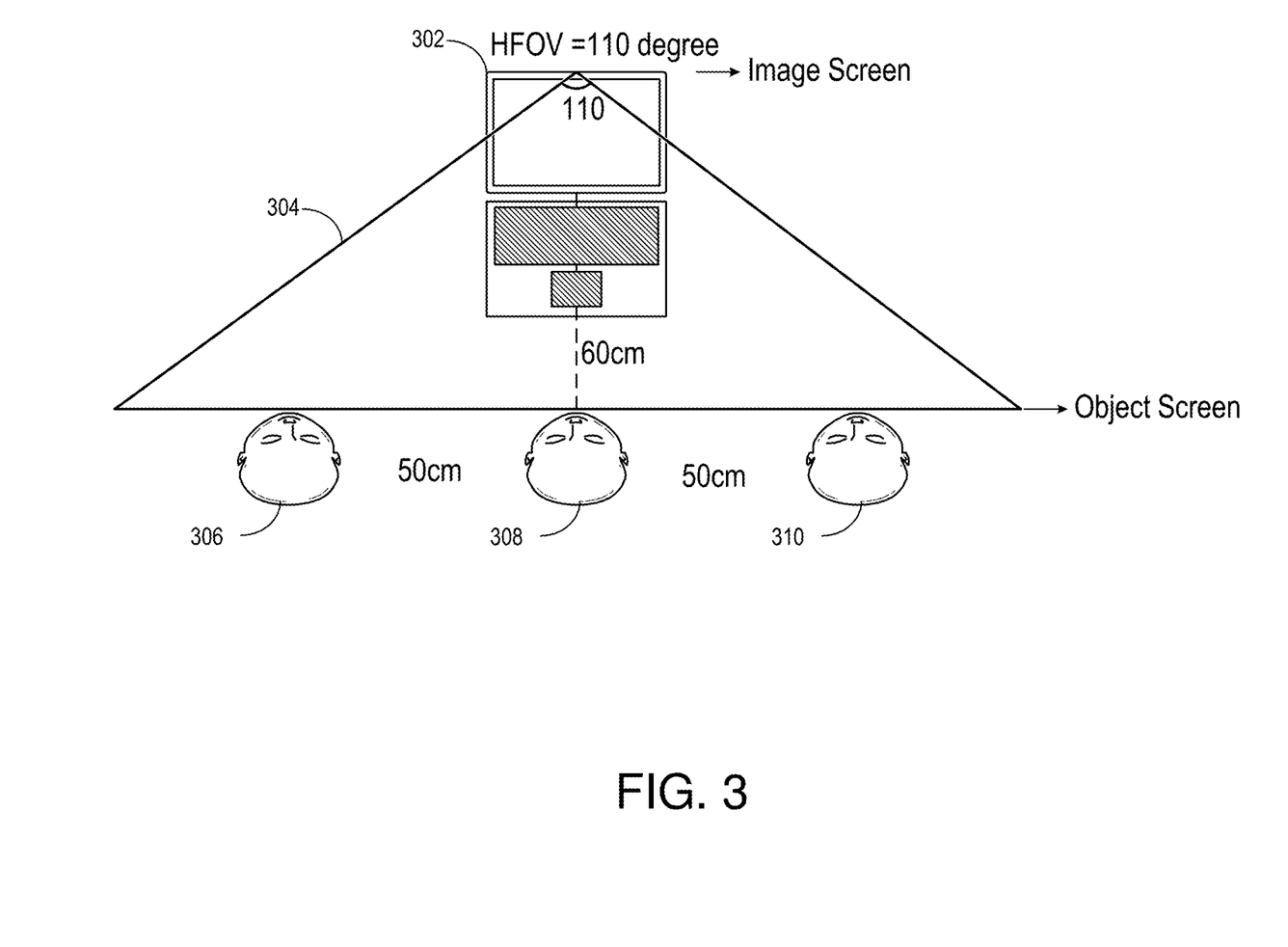

FIGS. 2 and 3 depict illustrative schematic diagrams for enhanced image quality, in accordance with one or more example embodiments of the present disclosure.

Referring to FIG. 2, there is shown a laptop 202 having a plurality of cameras installed in the lid of the laptop 202. The field of view of the camera defines the number of users that can be accommodated in the object frame as shown in FIG.

2 and FIG. 3. FIG. 2 shows the camera with Horizontal-FOV 204 (H-FOV)=68-degree less than two faces (e.g., faces 206 and 208) can be covered at a distance 60 cm from the device (with about 50 cm separation between the two cases).

Referring to FIG. 3, there is shown a laptop 302 having a plurality of cameras installed in the lid of the laptop 302. FIG. 3 shows H-FOV 304 is equal to 110 degree more than three faces (e.g., faces 306, 308, and 310) can be covered on the object screen at distance 60 cm from the camera.

Intel's Intelligent Collaboration 2.0 (IC2.0) frame work use cases demands a camera with maximum field of view and high resolution for effective video conferencing. Resolution of the sensor defines the quality of the image captured by the camera. Table 1 shows the minimum face resolution required for different algorithms based on IC 2.0. For high visual quality camera needs to capture 380 pixels/face width.

TABLE 1

Face resolution requirements.

| Average human face width | 15 cm |
| --- | --- |
| Algorithm | Number of pixels per face |
| Face Detection Algorithm | 17 |
| Face Recognition Algorithm | 40 |
| Human recognition of know person | 80 |
| Human recognition of unknown person | 150 |
| Base visual quality | 160 |
| High visual quality | 380 |

As the camera resolution and FOV go higher, the thickness of the camera increases. Hence, a panamorph lens design is employed to reduce camera Y and Z dimensions for narrow bezel and slim laptop design.

As the FOV is increased for a same resolution camera, the pixel per face reduces proportionally. Table 2 provides the relation between FOV and pixel per face.

TABLE 2

FOV vs Pixel per Face

| | H-FOV = 89 degree 8M Pixel size = 1.008 | | H-FOV = 65 degree 8M Pixel size = 1.008 | |
| --- | --- | --- | --- | --- |
| User Distance in cm | Number of users on frame | Pixel/face | Number of users on frame | Pixel/face |
| 60 | 2.35 | 414 | 1.52 | 639 |
| 70 | 2.75 | 355 | 1.78 | 548 |
| 80 | 3.14 | 310 | 2.03 | 479 |
| 90 | 3.53 | 276 | 2.29 | 426 |
| 100 | 3.93 | 248 | 2.54 | 383 |
| 110 | 4.32 | 226 | 2.803 | 348 |
| 120 | 4.71 | 207 | 3.05 | 319 |
| 130 | 5.11 | 191 | 3.312 | 295 |
| 140 | 5.5 | 177 | 3.5 | 274 |

As per Table 2:
1. For the same resolution camera (8 Mp) with H-FOV 89 degrees covers more than 2 user faces on the object screen at 60 cm from the camera, while 65-degree H-FOV covers 1.5 faces.
2. While the Number of users on frame increases with 89-degree H-FOV, pixel per face reduces drastically after 110 cm. When compared against H-FOV 65-degree the pixel per face remains above 270 at a 140 cm distance.

In one or more embodiments, an enhanced image quality system may facilitate a novel method where the algorithm exploits narrow FOV camera property for higher pixel per face (region of interest) at a longer distance and wide FOV camera property of a higher number of the face on object screen. It is understood that the above descriptions are for purposes of illustration and are not meant to be limiting.

Figure 4:
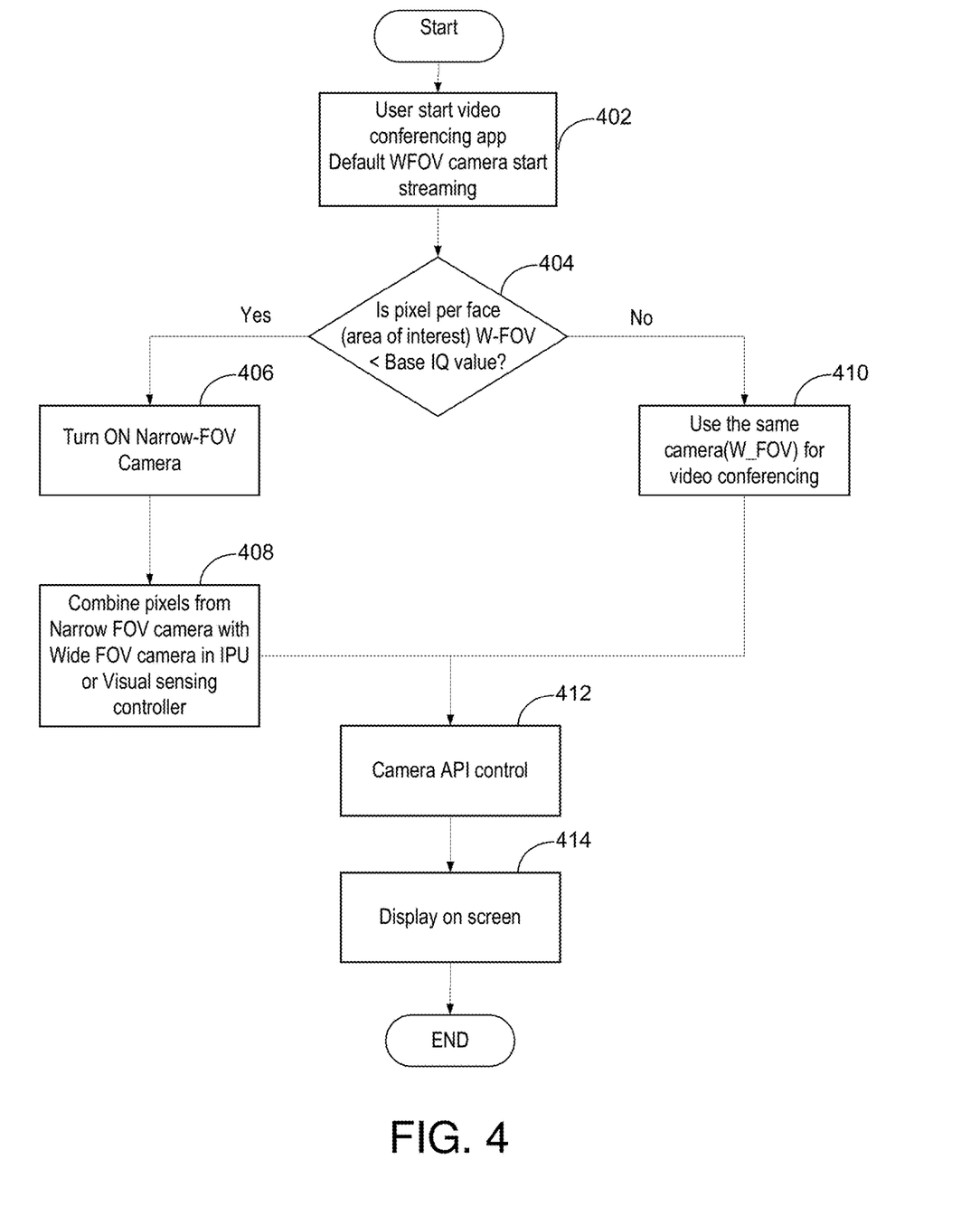
FIG. 4 depicts an illustrative flow diagram for enhanced image quality, in accordance with one or more example embodiments of the present disclosure.

FIG. 4 depicts an illustrative flow diagram for enhanced image quality, in accordance with one or more example embodiments of the present disclosure.

In one or more embodiments, an enhanced image quality system may execute an algorithm that starts at block 402, when a user opens a video application (e.g., a video conferencing application or camera application for image capture). The image processing unit (IPU) (e.g., as implemented in the video coding system 600) starts detecting the video stream for wide FOV camera. In some scenarios, the default camera used is a wide FOV camera, however, there may situations where the default may be using a narrow FOV camera at the start of the algorithm.

Image fusion is defined as gathering all the important information from multiple images, and their inclusion into fewer images, usually a single one. This single image is more informative and accurate than any single source image, and it consists of all the necessary information. An enhanced image quality system may perform image fusion by fusing image data from two RGB cameras that need to be fused (not RGB+Mono).

Image stitching is considered an active research area in computer vision and computer graphics. Image stitching is concerned with combining two or more images of the same scene into one high resolution image which is called panoramic image. Image stitching techniques can be categorized into two general approaches: direct and feature-based techniques. Direct techniques compare all the pixel intensities of the images with each other, whereas feature-based techniques aim to determine a relationship between the images through distinct features extracted from the processed images. The last approach has the advantage of being more robust against scene movement, faster, and has the ability to automatically discover the overlapping relationships among an unordered set of images. An enhanced image quality system may perform stitching of an inner smaller image to a wider outside image.

Camera switching is the process of using two or more camera setups in order to harness the physical properties of the lenses of both a wide FOV and a narrow FOV cameras. This provides the users with a smooth, high-quality image experience.

At block 404, an enhanced image quality system may identify if the pixel per face (or object of interest) on captured image is less than the base image quality value (threshold), this is configurable from system to system based on the camera's resolution and system design (e.g., based on Table 1 above).

At block 406, if the pixel per face value is less than base value, the enhanced image quality system may turn on the camera stream from a narrow FOV camera for better pixel resolution for the area of interest in this case, the user face is the area of interest.

At block 408, techniques of image combination (e.g., fusion, stitching, camera switching) are applied, either a direct pixel-pixel matching technique can be followed or feature extraction-based technique can be applied. The following are steps that may be employed by the enhanced image quality system.

Step 1: Choose the image composition surface.

Step 2: Estimate correct alignment corresponding to a various collection.

Step 3: Determine the overlapping area of interest.

Step 4: Shift pixel from one image to another (area of interest) to find pixel alignment.

Step 5: Find the global minima of the pixels.

Step 6: Combine/fuse WFOV and NFOV camera images.

In one or more embodiments, an enhanced image quality system may identify a base image quality from wide FOV camera to instruct the IPU to perform combination techniques in order to ensure the resolution is above the threshold range, which will help to smoothly extract high resolution area of interest and combine/fuse the image before getting displayed on the screen.

At block 410, if the pixels per face (area of interest) using the wide FOV camera, in this example, are greater than the base value, the enhanced image quality system may use the same camera (e.g., wide FOV camera in this example) without having the need to turn on the narrow FOV camera.

At block 412, an enhanced image quality system may engage the camera application programming interface (API) control for image processing for media capture capabilities (e.g., record audio, take a picture, or record a video with the camera).

At block 414, an enhanced image quality system may display the image (e.g. either complain pixels or using the pixels from the same camera) on a screen.

It is understood that the above descriptions are for purposes of illustration and are not meant to be limiting.

Figure 5:
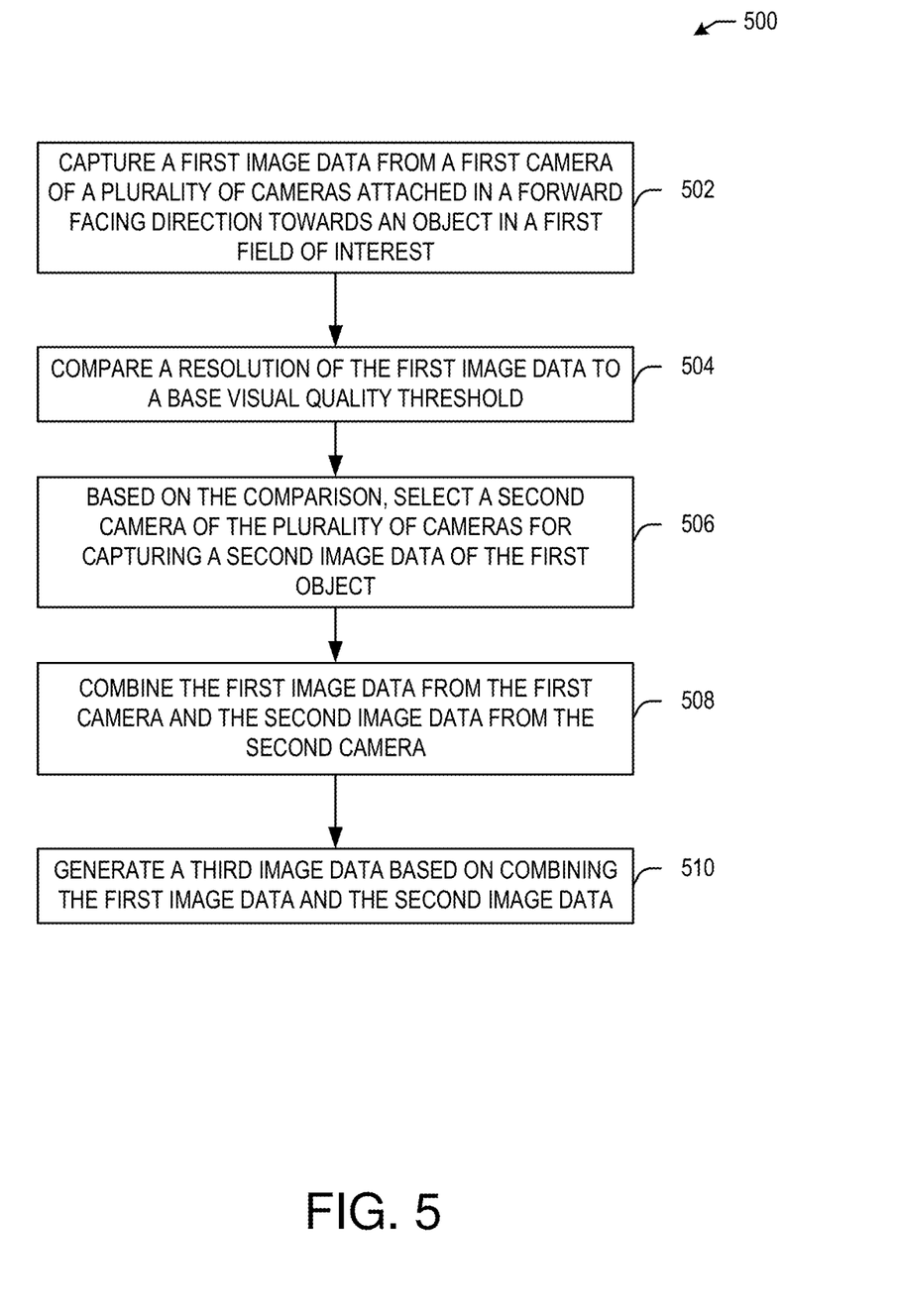
FIG. 5 illustrates a flow diagram of a process for an illustrative enhanced image quality system, in accordance with one or more example embodiments of the present disclosure.

FIG. 5 illustrates a flow diagram of a process 500 for an enhanced image quality system, in accordance with one or more example embodiments of the present disclosure.

At block 502, a device (e.g., the enhanced image quality device of FIG. 1 and/or the enhanced image quality device 719 of FIG. 7) may capture a first image data from a first camera of a plurality of cameras attached in a forward facing direction toward an object in a first field of interest. Each of the plurality of cameras has a thickness of less than or equal to 5 mm. At block 504, the device may compare a resolution of the first image data to a base visual quality threshold. The base visual quality threshold is based on a predetermined value. The base visual quality threshold is associated with the object and wherein the object is a face of a user. The resolution of the first image data is less than 160 pixels per object.

At block 506, the device may, based on the comparison, select a second camera of the plurality of cameras for capturing a second image data of the object. The first camera may be a wide field of view (FOV). The second camera may be a narrow field of view (FOV).

At block 508, the device may combine the first image data from the first camera and the second image data from the second camera. Combining the first image data and a second image data comprises fusing, stitching, or switching between the first camera and the second camera. The device may further determine the resolution of the first image data is greater than the base visual quality threshold. The device may display the first image data on a screen. The device may further determine the resolution of the first image data is less than the base visual quality threshold. The device may display the third image data on a screen.

At block 510, the device may generate a third image data based on combining the first image data and the second image data.

It is understood that the above descriptions are for purposes of illustration and are not meant to be limiting.

Figure 6:
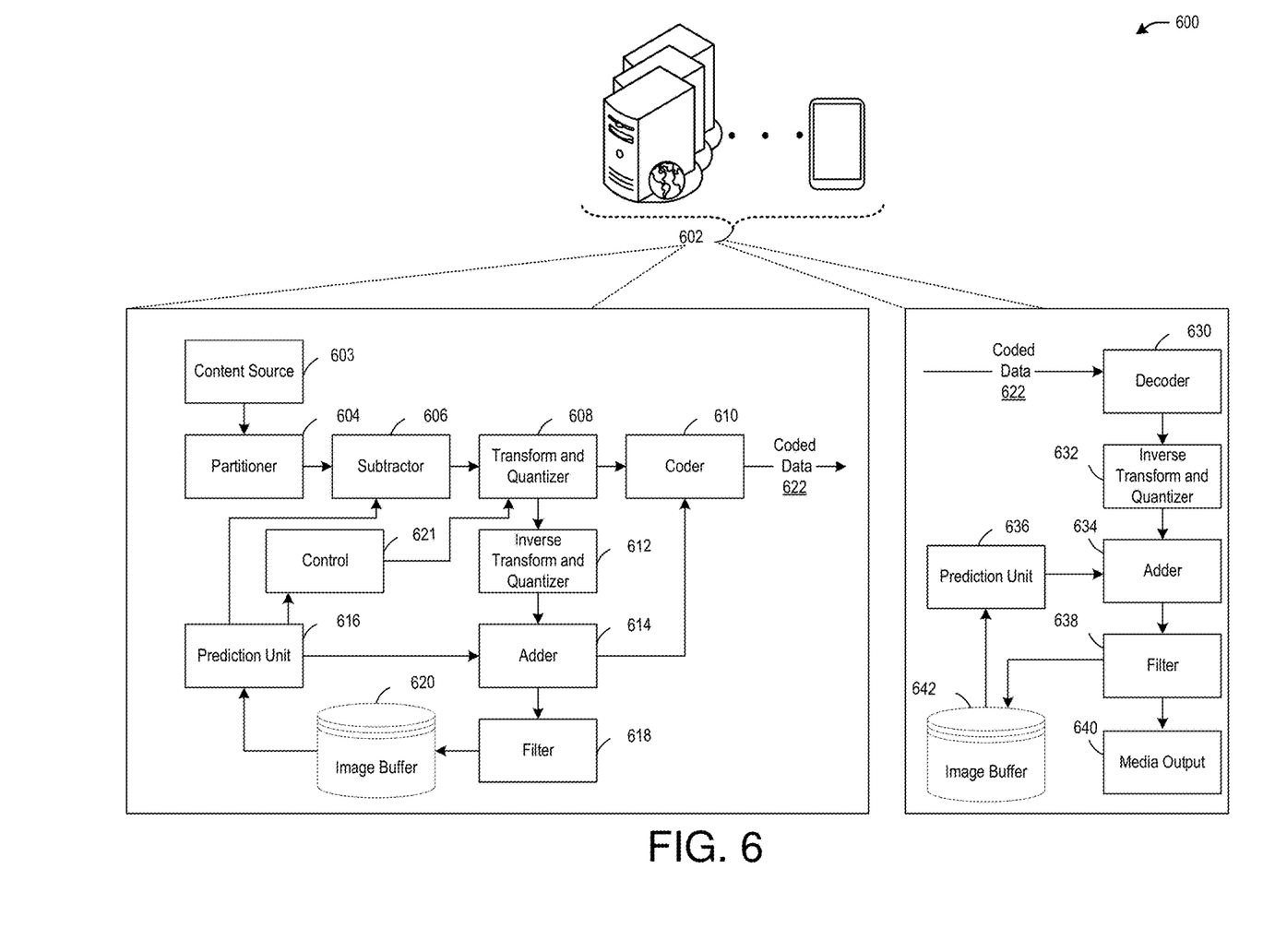
FIG. 6 depicts an example system illustrating components of encoding and decoding devices, in accordance with one or more example embodiments of the present disclosure.

FIG. 6 depicts an example system 600 illustrating components of encoding and decoding devices, according to some example embodiments of the present disclosure.

Referring to FIG. 6, the system 600 may include devices 602 having encoder and/or decoder components. As shown, the devices 602 may include a content source 603 that provides video and/or audio content (e.g., a camera or other image capture device, stored images/video, etc.). The content source 603 may provide media (e.g., video and/or audio) to a partitioner 604, which may prepare frames of the content for encoding. A subtractor 606 may generate a residual as explained further herein. A transform and quantizer 608 may generate and quantize transform units to facilitate encoding by a coder 610 (e.g., entropy coder). Transform and quantized data may be inversely transformed and inversely quantized by an inverse transform and quantizer 612. An adder 614 may compare the inversely transformed and inversely quantized data to a prediction block generated by a prediction unit 616, resulting in reconstructed frames. A filter 618 (e.g., in-loop filter for resizing/cropping, color conversion, de-interlacing, composition/blending, etc.) may revise the reconstructed frames from the adder 614, and may store the reconstructed frames in an image buffer 620 for use by the prediction unit 616. A control 621 may manage many encoding aspects (e.g., parameters) including at least the setting of a quantization parameter (QP) but could also include setting bitrate, rate distortion or scene characteristics, prediction and/or transform partition or block sizes, available prediction mode types, and best mode selection parameters, for example, based at least partly on data from the prediction unit 616. Using the encoding aspects, the transform and quantizer 608 may generate and quantize transform units to facilitate encoding by the coder 610, which may generate coded data 622 that may be transmitted (e.g., an encoded bitstream).

Still referring to FIG. 6, the devices 602 may receive coded data (e.g., the coded data 622) in a bitstream, and a decoder 630 may decode the coded data, extracting quantized residual coefficients and context data. An inverse transform and quantizer 632 may reconstruct pixel data based on the quantized residual coefficients and context data. An adder 634 may add the residual pixel data to a predicted block generated by a prediction unit 636. A filter 638 may filter the resulting data from the adder 634. The filtered data may be output by a media output 640, and also may be stored as reconstructed frames in an image buffer 642 for use by the prediction unit 636.

Referring to FIG. 6, the system 600 performs the methods of intra prediction disclosed herein, and is arranged to perform at least one or more of the implementations described herein including intra block copying. In various implementations, the system 600 may be configured to undertake video coding and/or implement video codecs according to one or more standards. Further, in various forms, video coding system 600 may be implemented as part of an image processor (e.g., image processing unit (IPU)), video processor, and/or media processor and undertakes inter-prediction, intra-prediction, predictive coding, and residual prediction. In various implementations, system 600 may undertake video compression and decompression and/or implement video codecs according to one or more standards or specifications, such as, for example, H.264 (Advanced Video Coding, or AVC), VP8, H.265 (High Efficiency Video Coding or HEVC) and SCC extensions thereof, VP9, Alliance Open Media Version 1 (AV1), H.266 (Versatile Video Coding, or VVC), DASH (Dynamic Adaptive Streaming over HTTP), and others. Although system 600 and/or other systems, schemes or processes may be described herein, the present disclosure is not necessarily always limited to any particular video coding standard or specification or extensions thereof.

As used herein, the term "coder" may refer to an encoder and/or a decoder. Similarly, as used herein, the term "coding" may refer to encoding via an encoder and/or decoding via a decoder. A coder, encoder, or decoder may have components of both an encoder and decoder. An encoder may have a decoder loop as described below.

For example, the system 600 may be an encoder where current video information in the form of data related to a sequence of video frames may be received to be compressed. By one form, a video sequence (e.g., from the content source 603) is formed of input frames of synthetic screen content such as from, or for, business applications such as word processors, power points, or spread sheets, computers, video games, virtual reality images, and so forth. By other forms, the images may be formed of a combination of synthetic screen content and natural camera captured images. By yet another form, the video sequence only may be natural camera captured video. The partitioner 604 may partition each frame into smaller more manageable units, and then compare the frames to compute a prediction. If a difference or residual is determined between an original block and prediction, that resulting residual is transformed and quantized, and then entropy encoded and transmitted in a bitstream, along with reconstructed frames, out to decoders or storage. To perform these operations, the system 600 may receive an input frame from the content source 603. The input frames may be frames sufficiently pre-processed for encoding.

The system 600 also may manage many encoding aspects including at least the setting of a quantization parameter (QP) but could also include setting bitrate, rate distortion or scene characteristics, prediction and/or transform partition or block sizes, available prediction mode types, and best mode selection parameters to name a few examples.

The output of the transform and quantizer 608 may be provided to the inverse transform and quantizer 612 to generate the same reference or reconstructed blocks, frames, or other units as would be generated at a decoder such as decoder 630. Thus, the prediction unit 616 may use the inverse transform and quantizer 612, adder 614, and filter 618 to reconstruct the frames.

The prediction unit 616 may perform inter-prediction including motion estimation and motion compensation, intra-prediction according to the description herein, and/or a combined inter-intra prediction. The prediction unit 616 may select the best prediction mode (including intra-modes) for a particular block, typically based on bit-cost and other factors. The prediction unit 616 may select an intra-prediction and/or inter-prediction mode when multiple such modes of each may be available. The prediction output of the prediction unit 616 in the form of a prediction block may be provided both to the subtractor 606 to generate a residual, and in the decoding loop to the adder 614 to add the prediction to the reconstructed residual from the inverse transform to reconstruct a frame.

The partitioner 604 or other initial units not shown may place frames in order for encoding and assign classifications to the frames, such as I-frame, B-frame, P-frame and so forth, where I-frames are intra-predicted. Otherwise, frames may be divided into slices (such as an I-slice) where each slice may be predicted differently. Thus, for HEVC or AV1 coding of an entire I-frame or I-slice, spatial or intra-prediction is used, and in one form, only from data in the frame itself.

In various implementations, the prediction unit 616 may perform an intra block copy (IBC) prediction mode and a non-IBC mode operates any other available intra-prediction mode such as neighbor horizontal, diagonal, or direct coding (DC) prediction mode, palette mode, directional or angle modes, and any other available intra-prediction mode. Other video coding standards, such as HEVC or VP9 may have different sub-block dimensions but still may use the IBC search disclosed herein. It should be noted, however, that the foregoing are only example partition sizes and shapes, the present disclosure not being limited to any particular partition and partition shapes and/or sizes unless such a limit is mentioned or the context suggests such a limit, such as with the optional maximum efficiency size as mentioned. It should be noted that multiple alternative partitions may be provided as prediction candidates for the same image area as described below.

The prediction unit 616 may select previously decoded reference blocks. Then comparisons may be performed to determine if any of the reference blocks match a current block being reconstructed. This may involve hash matching, SAD search, or other comparison of image data, and so forth. Once a match is found with a reference block, the prediction unit 616 may use the image data of the one or more matching reference blocks to select a prediction mode. By one form, previously reconstructed image data of the reference block is provided as the prediction, but alternatively, the original pixel image data of the reference block could be provided as the prediction instead. Either choice may be used regardless of the type of image data that was used to match the blocks.

The predicted block then may be subtracted at subtractor 606 from the current block of original image data, and the resulting residual may be partitioned into one or more transform blocks (TUs) so that the transform and quantizer 608 can transform the divided residual data into transform coefficients using discrete cosine transform (DCT) for example. Using the quantization parameter (QP) set by the system 600, the transform and quantizer 608 then uses lossy resampling or quantization on the coefficients. The frames and residuals along with supporting or context data block size and intra displacement vectors and so forth may be entropy encoded by the coder 610 and transmitted to decoders.

In one or more embodiments, a system 600 may have, or may be, a decoder, and may receive coded video data in the form of a bitstream and that has the image data (chroma and luma pixel values) and as well as context data including residuals in the form of quantized transform coefficients and the identity of reference blocks including at least the size of the reference blocks, for example. The context also may include prediction modes for individual blocks, other partitions such as slices, inter-prediction motion vectors, partitions, quantization parameters, filter information, and so forth. The system 600 may process the bitstream with an entropy decoder 630 to extract the quantized residual coefficients as well as the context data. The system 600 then may use the inverse transform and quantizer 632 to reconstruct the residual pixel data.

The system 600 then may use an adder 634 (along with assemblers not shown) to add the residual to a predicted block. The system 600 also may decode the resulting data using a decoding technique employed depending on the coding mode indicated in syntax of the bitstream, and either a first path including a prediction unit 636 or a second path that includes a filter 638. The prediction unit 636 performs intra-prediction by using reference block sizes and the intra displacement or motion vectors extracted from the bitstream, and previously established at the encoder. The prediction unit 636 may utilize reconstructed frames as well as inter-prediction motion vectors from the bitstream to reconstruct a predicted block. The prediction unit 636 may set the correct prediction mode for each block, where the prediction mode may be extracted and decompressed from the compressed bitstream.

In one or more embodiments, the coded data 622 may include both video and audio data. In this manner, the system 600 may encode and decode both audio and video.

It is understood that the above descriptions are for purposes of illustration and are not meant to be limiting.

Figure 7:
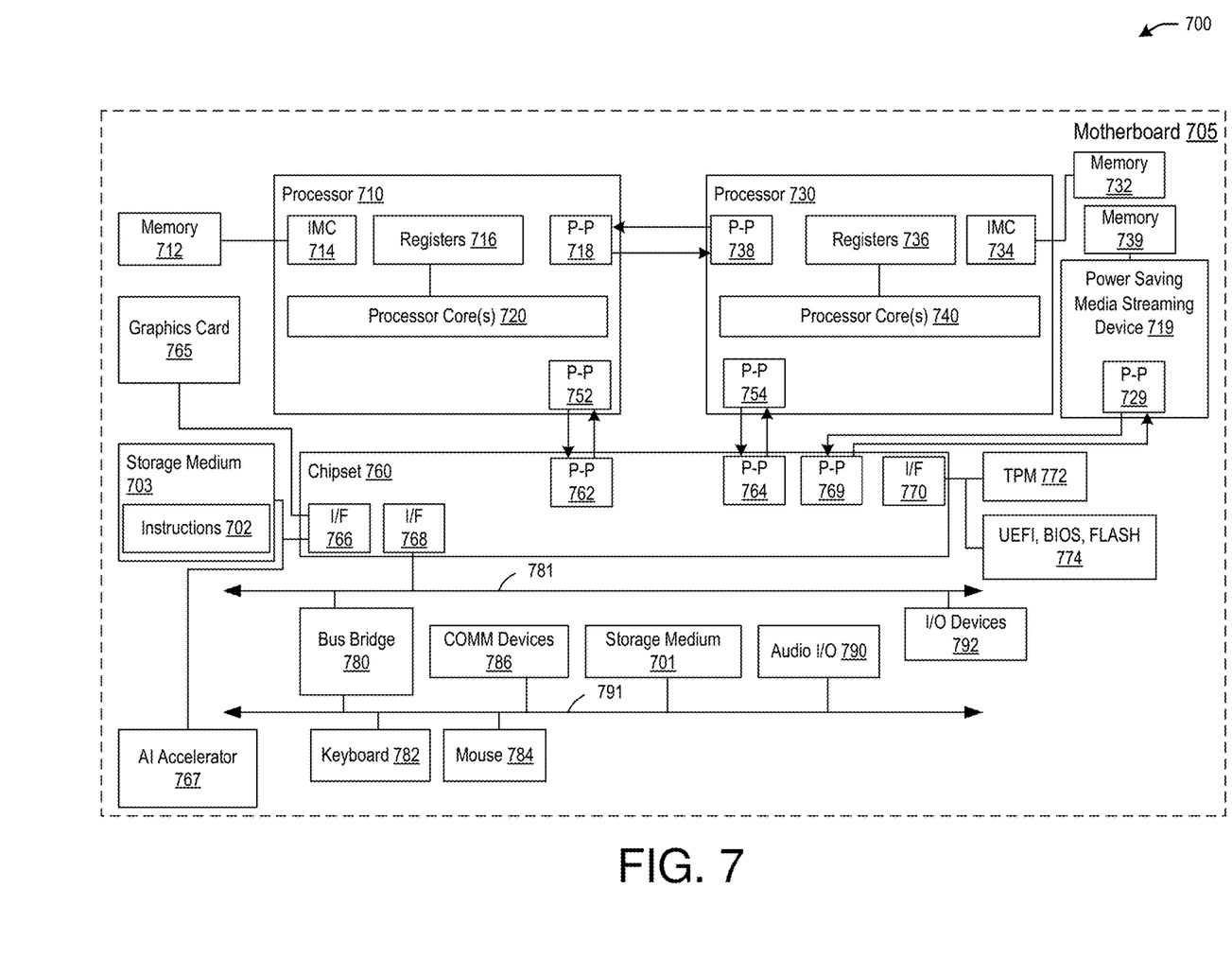
FIG. 7 is a block diagram illustrating an example of a computing device or computing system upon which any of one or more techniques (e.g., methods) may be performed, in accordance with one or more example embodiments of the present disclosure.

FIG. 7 illustrates an embodiment of an exemplary system 700, in accordance with one or more example embodiments of the present disclosure.

In various embodiments, the computing system 700 may comprise or be implemented as part of an electronic device.

In some embodiments, the computing system 700 may be representative, for example, of a computer system that implements one or more components of FIG. 1.

The embodiments are not limited in this context. More generally, the computing system 700 is configured to implement all logic, systems, processes, logic flows, methods, equations, apparatuses, and functionality described herein and with reference to FIGS. 1-6.

The system 700 may be a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, a handheld device such as a personal digital assistant (PDA), or other devices for processing, displaying, or transmitting information. Similar embodiments may comprise, e.g., entertainment devices such as a portable music player or a portable video player, a smart phone or other cellular phones, a telephone, a digital video camera, a digital still camera, an external storage device, or the like. Further embodiments implement larger scale server configurations. In other embodiments, the system 700 may have a single processor with one core or more than one processor. Note that the term "processor" refers to a processor with a single core or a processor package with multiple processor cores.

In at least one embodiment, the computing system 700 is representative of one or more components of FIG. 1. More generally, the computing system 700 is configured to implement all logic, systems, processes, logic flows, methods, apparatuses, and functionality described herein with reference to the above figures.

As used in this application, the terms "system" and "component" and "module" are intended to refer to a computer-related entity, either hardware, a combination of hardware and software, software, or software in execution, examples of which are provided by the exemplary system 700. For example, a component can be, but is not limited to being, a process running on a processor, a processor, a hard disk drive, multiple storage drives (of optical and/or magnetic storage medium), an object, an executable, a thread of execution, a program, and/or a computer.

By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 700 comprises a motherboard 705 for mounting platform components. The motherboard 705 is a point-to-point interconnect platform that includes a processor 710, a processor 730 coupled via a point-to-point interconnects as an Ultra Path Interconnect (UPI), and an enhanced image quality device 719. In other embodiments, the system 700 may be of another bus architecture, such as a multi-drop bus. Furthermore, each of processors 710 and 730 may be processor packages with multiple processor cores. As an example, processors 710 and 730 are shown to include processor core(s) 720 and 740, respectively. While the system 700 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 710 and the chipset 760. Some platforms may include additional components and some platforms may only include sockets to mount the processors and/or the chipset.

The processors 710 and 730 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processors 710, and 730.

The processor 710 includes an integrated memory controller (IMC) 714, registers 716, and point-to-point (P-P) interfaces 718 and 752. Similarly, the processor 730 includes an IMC 734, registers 736, and P-P interfaces 738 and 754. The IMC's 714 and 734 couple the processors 710 and 730, respectively, to respective memories, a memory 712 and a memory 732. The memories 712 and 732 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 712 and 732 locally attach to the respective processors 710 and 730.

In addition to the processors 710 and 730, the system 700 may include an enhanced image quality device 719. The enhanced image quality device 719 may be connected to chipset 760 by means of P-P interfaces 729 and 769. The enhanced image quality device 719 may also be connected to a memory 739. In some embodiments, the enhanced image quality device 719 may be connected to at least one of the processors 710 and 730. In other embodiments, the memories 712, 732, and 739 may couple with the processor 710 and 730, and the enhanced image quality device 719 via a bus and shared memory hub.

System 700 includes chipset 760 coupled to processors 710 and 730. Furthermore, chipset 760 can be coupled to storage medium 703, for example, via an interface (I/F) 766. The OF 766 may be, for example, a Peripheral Component Interconnect-enhanced (PCI-e). The processors 710, 730, and the enhanced image quality device 719 may access the storage medium 703 through chipset 760.

Storage medium 703 may comprise any non-transitory computer-readable storage medium or machine-readable storage medium, such as an optical, magnetic or semiconductor storage medium. In various embodiments, storage medium 703 may comprise an article of manufacture. In some embodiments, storage medium 703 may store computer-executable instructions, such as computer-executable instructions 702 to implement one or more of processes or operations described herein, (e.g., process 500 of FIG. 5). The storage medium 703 may store computer-executable instructions for any equations depicted above. The storage medium 703 may further store computer-executable instructions for models and/or networks described herein, such as a neural network or the like. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable types of code, such as source code, compiled code, interpreted code, executable code, static code, dynamic code, object-oriented code, visual code, and the like. It should be understood that the embodiments are not limited in this context.

The processor 710 couples to a chipset 760 via P-P interfaces 752 and 762 and the processor 730 couples to a chipset 760 via P-P interfaces 754 and 764. Direct Media Interfaces (DMIs) may couple the P-P interfaces 752 and 762 and the P-P interfaces 754 and 764, respectively. The DMI may be a high-speed interconnect that facilitates, e.g., eight Giga Transfers per second (GT/s) such as DMI 3.0. In other embodiments, the processors 710 and 730 may interconnect via a bus.

The chipset 760 may comprise a controller hub such as a platform controller hub (PCH). The chipset 760 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 760 may comprise more than one controller hub such as a chipset with a memory controller hub, a graphics controller hub, and an input/output (I/O) controller hub.

In the present embodiment, the chipset 760 couples with a trusted platform module (TPM) 772 and the UEFI, BIOS, Flash component 774 via an interface (I/F) 770. The TPM 772 is a dedicated microcontroller designed to secure hardware by integrating cryptographic keys into devices. The UEFI, BIOS, Flash component 774 may provide pre-boot code.

Furthermore, chipset 760 includes the OF 766 to couple chipset 760 with a high-performance graphics engine, graphics card 765. In other embodiments, the system 700 may include a flexible display interface (FDI) between the processors 710 and 730 and the chipset 760. The FDI interconnects a graphics processor core in a processor with the chipset 760.

Various I/O devices 792 couple to the bus 781, along with a bus bridge 780 which couples the bus 781 to a second bus 791 and an OF 768 that connects the bus 781 with the chipset 760. In one embodiment, the second bus 791 may be a low pin count (LPC) bus. Various devices may couple to the second bus 791 including, for example, a keyboard 782, a mouse 784, communication devices 786, a storage medium 701, and an audio I/O 790.

The artificial intelligence (AI) accelerator 767 may be circuitry arranged to perform computations related to AI. The AI accelerator 767 may be connected to storage medium 703 and chipset 760. The AI accelerator 767 may deliver the processing power and energy efficiency needed to enable abundant-data computing. The AI accelerator 767 is a class of specialized hardware accelerators or computer systems designed to accelerate artificial intelligence and machine learning applications, including artificial neural networks and machine vision. The AI accelerator 767 may be applicable to algorithms for robotics, internet of things, other data-intensive and/or sensor-driven tasks.

Many of the I/O devices 792, communication devices 786, and the storage medium 701 may reside on the motherboard 705 while the keyboard 782 and the mouse 784 may be add-on peripherals. In other embodiments, some or all the I/O devices 792, communication devices 786, and the storage medium 701 are add-on peripherals and do not reside on the motherboard 705.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

In addition, in the foregoing Detailed Description, various features are grouped together in a single example to streamline the disclosure. This method of disclosure is not to be interpreted as reflecting an intention that the claimed examples require more features than are expressly recited in each claim. Rather, as the following claims reflect, the inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chipset, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The following examples pertain to further embodiments.

Example 1 may include a system that comprises at least one memory that stores computer-executable instructions; and at least one processor configured to access the at least one memory and execute the computer-executable instructions to: capture a first image data from a first camera of a plurality of cameras attached in a forward facing direction towards an object in a first field of interest; compare a resolution of the first image data to a base visual quality threshold; based on the comparison, select a second camera of the plurality of cameras for capturing a second image data of the first object; combine the first image data from the first camera and the second image data from the second camera; and generate a third image data based on combining the first image data and the second image data.

Example 2 may include the system of example 1 and/or some other example herein, wherein combining the first image and a second image comprises fusing, stitching, or switching between the first camera and the second camera.

Example 3 may include the system of example 1 and/or some other example herein, wherein the base visual quality threshold may be based on a predetermined value.

Example 4 may include the system of example 1 and/or some other example herein, wherein the first resolution of the first image may be less than 160 pixels per object.

Example 5 may include the system of example 1 and/or some other example herein, wherein each of the plurality of cameras has a thickness of less than or equal to 5 mm.

Example 6 may include the system of example 1 and/or some other example herein, wherein the first camera may be a wide field of view (FOV).

Example 7 may include the system of example 1 and/or some other example herein, wherein the second camera may be a narrow field of view (FOV).

Example 8 may include the system of example 1 and/or some other example herein, wherein the base visual quality threshold may be associated with the object and wherein the objects may be a phase of a user.

Example 9 may include the system of example 1 and/or some other example herein, further comprising the instructions to: determine the first resolution of the first image may be greater than the base visual quality threshold; and display the first image data on a screen.

Example 10 may include the system of example 1 and/or some other example herein, further comprising the instructions to: determine the first resolution of the first image may be less than the base visual quality threshold; and display the third image data on a screen.

Example 11 may include a non-transitory computer-readable medium storing computer-executable instructions which when executed by one or more processors result in performing operations comprising: capturing a first image data from a first camera of a plurality of cameras attached in a forward facing direction towards an object in a first field of interest; comparing a resolution of the first image data to a base visual quality threshold; based on the comparison, selecting a second camera of the plurality of cameras for capturing a second image data of the first object; combining the first image data from the first camera and the second image data from the second camera; and generating a third image data based on combining the first image data and the second image data.

Example 12 may include the non-transitory computer-readable medium of example 11 and/or some other example herein, wherein combining the first image and a second image comprises fusing, stitching, or switching between the first camera and the second camera.

Example 13 may include the non-transitory computer-readable medium of example 11 and/or some other example herein, wherein the base visual quality threshold may be based on a predetermined value.

Example 14 may include the non-transitory computer-readable medium of example 11 and/or some other example herein, wherein the first resolution of the first image may be less than 160 pixels per object.

Example 15 may include the non-transitory computer-readable medium of example 11 and/or some other example herein, wherein each of the plurality of cameras has a thickness of less than or equal to 5 mm.

Example 16 may include the non-transitory computer-readable medium of example 11 and/or some other example herein, wherein the first camera may be a wide field of view (FOV).

Example 17 may include the non-transitory computer-readable medium of example 11 and/or some other example herein, wherein the second camera may be a narrow field of view (FOV).

Example 18 may include the non-transitory computer-readable medium of example 11 and/or some other example herein, wherein the base visual quality threshold may be associated with the object and wherein the objects may be a phase of a user.

Example 19 may include the non-transitory computer-readable medium of example 11 and/or some other example herein, further comprising the instructions to: determining the first resolution of the first image may be greater than the base visual quality threshold; and displaying the first image data on a screen.

Example 20 may include the non-transitory computer-readable medium of example 11 and/or some other example herein, further comprising the instructions to: determining the first resolution of the first image may be less than the base visual quality threshold; and displaying the third image data on a screen.

Example 21 may include a method comprising: capturing a first image data from a first camera of a plurality of cameras attached in a forward facing direction towards an object in a first field of interest; comparing a resolution of the first image data to a base visual quality threshold; based on the comparison, selecting a second camera of the plurality of cameras for capturing a second image data of the first object; combining the first image data from the first camera and the second image data from the second camera; and generating a third image data based on combining the first image data and the second image data.

Example 22 may include the method of example 1 and/or some other example herein, wherein combining the first image and a second image comprises fusing, stitching, or switching between the first camera and the second camera.

Example 23 may include the method of example 1 and/or some other example herein, wherein the base visual quality threshold may be based on a predetermined value.

Example 24 may include the method of example 1 and/or some other example herein, wherein the first resolution of the first image may be less than 160 pixels per object.

Example 25 may include the method of example 1 and/or some other example herein, wherein each of the plurality of cameras has a thickness of less than or equal to 5 mm.

Example 26 may include the method of example 1 and/or some other example herein, wherein the first camera may be a wide field of view (FOV).

Example 27 may include the method of example 1 and/or some other example herein, wherein the second camera may be a narrow field of view (FOV).

Example 28 may include the method of example 1 and/or some other example herein, wherein the base visual quality threshold may be associated with the object and wherein the objects may be a phase of a user.

Example 29 may include the method of example 1 and/or some other example herein, further comprising the instructions to: determining the first resolution of the first image may be greater than the base visual quality threshold; and displaying the first image data on a screen.

Example 30 may include the method of example 1 and/or some other example herein, further comprising the instructions to: determining the first resolution of the first image may be less than the base visual quality threshold; and displaying the third image data on a screen.

Example 31 may include an apparatus comprising means for: capturing a first image data from a first camera of a plurality of cameras attached in a forward facing direction towards an object in a first field of interest; comparing a resolution of the first image data to a base visual quality threshold; based on the comparison, selecting a second camera of the plurality of cameras for capturing a second image data of the first object; combining the first image data from the first camera and the second image data from the second camera; and generating a third image data based on combining the first image data and the second image data.

Example 32 may include the apparatus of example 1 and/or some other example herein, wherein combining the first image and a second image comprises fusing, stitching, or switching between the first camera and the second camera.

Example 33 may include the apparatus of example 1 and/or some other example herein, wherein the base visual quality threshold may be based on a predetermined value.

Example 34 may include the apparatus of example 1 and/or some other example herein, wherein the first resolution of the first image may be less than 160 pixels per object.

Example 35 may include the apparatus of example 1 and/or some other example herein, wherein each of the plurality of cameras has a thickness of less than or equal to 5 mm.

Example 36 may include the apparatus of example 1 and/or some other example herein, wherein the first camera may be a wide field of view (FOV).

Example 37 may include the apparatus of example 1 and/or some other example herein, wherein the second camera may be a narrow field of view (FOV).

Example 38 may include the apparatus of example 1 and/or some other example herein, wherein the base visual quality threshold may be associated with the object and wherein the objects may be a phase of a user.

Example 39 may include the apparatus of example 1 and/or some other example herein, further comprising the instructions to: determining the first resolution of the first image may be greater than the base visual quality threshold; and displaying the first image data on a screen.

Example 40 may include the apparatus of example 1 and/or some other example herein, further comprising the instructions to: determining the first resolution of the first image may be less than the base visual quality threshold; and display the third image data on a screen.

Example 41 may include one or more non-transitory computer-readable media comprising instructions to cause an electronic device, upon execution of the instructions by one or more processors of the electronic device, to perform one or more elements of a method described in or related to any of examples 1-40, or any other method or process described herein.

Example 42 may include an apparatus comprising logic, modules, and/or circuitry to perform one or more elements of a method described in or related to any of examples 1-40, or any other method or process described herein.

Example 43 may include a method, technique, or process as described in or related to any of examples 1-40, or portions or parts thereof.

Example 44 may include an apparatus comprising: one or more processors and one or more computer readable media comprising instructions that, when executed by the one or more processors, cause the one or more processors to perform the method, techniques, or process as described in or related to any of examples 1-40, or portions thereof.

Example 45 may include a method of communicating in a wireless network as shown and described herein.

Example 46 may include a system for providing wireless communication as shown and described herein.

Example 47 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system comprising:
   at least one memory that stores computer-executable instructions; and
   at least one processor configured to access the at least one memory and execute the computer-executable instructions to:
   capture first image data from a first camera of a plurality of cameras attached in a forward facing direction towards an object in a first field of interest;
   compare a resolution of the first image data to a base visual quality threshold;
   based on the comparison, select a second camera of the plurality of cameras for capturing second image data of the object;
   combine the first image data from the first camera and the second image data from the second camera; and
   generate third image data based on the combination of the first image data and the second image data.

2. The system of claim 1, wherein the at least one processor is to combine the first image data and the second image data based on at least one of fusing, stitching, or switching between the first camera and the second camera.

3. The system of claim 1, wherein the base visual quality threshold is based on a predetermined value.

4. The system of claim 1, wherein the resolution of the first image data is less than 160 pixels per object.

5. The system of claim 1, wherein each of the plurality of cameras has a thickness of less than or equal to 5 mm.

6. The system of claim 1, wherein the first camera is a wide field of view (FOV).

7. The system of claim 1, wherein the second camera is a narrow field of view (FOV).

8. The system of claim 1, wherein the base visual quality threshold is associated with the object and the object is a face of a user.

9. The system of claim 1, wherein the at least one processor is to:
   determine the resolution of the first image data is greater than the base visual quality threshold; and
   cause display of the first image data on a screen.

10. The system of claim 1, wherein the at least one processor is to:
    determine the resolution of the first image data is less than the base visual quality threshold; and
    cause display of the third image data on a screen.

11. A non-transitory computer-readable medium comprising computer-executable instructions which, when executed, cause one or more processors to at least:
    capture first image data from a first camera of a plurality of cameras attached in a forward facing direction towards an object in a first field of interest;
    compare a resolution of the first image data to a base visual quality threshold;
    based on the comparison, select a second camera of the plurality of cameras for capturing second image data of the object;
    combine the first image data from the first camera and the second image data from the second camera; and
    generate a third image data based on the combination of the first image data and the second image data.

12. The non-transitory computer-readable medium of claim 11, wherein the computer-executable instructions are to cause the one or more processors to combine the first image data and the second image data based on at least one of fusing, stitching, or switching between the first camera and the second camera.

13. The non-transitory computer-readable medium of claim 11, wherein the base visual quality threshold is based on a predetermined value.

14. The non-transitory computer-readable medium of claim 11, wherein the resolution of the first image data is less than 160 pixels per object.

15. The non-transitory computer-readable medium of claim 11, wherein each of the plurality of cameras has a thickness of less than or equal to 5 mm.

16. The non-transitory computer-readable medium of claim 11, wherein the first camera is a wide field of view (FOV).

17. The non-transitory computer-readable medium of claim 11, wherein the second camera is a narrow field of view (FOV).

18. The non-transitory computer-readable medium of claim 11, wherein the base visual quality threshold is associated with the object and the object is a face of a user.

19. A method comprising:
capturing first image data from a first camera of a plurality of cameras attached in a forward facing direction towards an object in a first field of interest;
comparing a resolution of the first image data to a base visual quality threshold;
based on the comparison, selecting a second camera of the plurality of cameras for capturing second image data of the object;
combining the first image data from the first camera and the second image data from the second camera; and
generating third image data based on the combination of the first image data and the second image data.

20. The method of claim 19, wherein the combining of the first image data and the second image data includes at least one of fusing, stitching, or switching between the first camera and the second camera.

\* \* \* \* \*